Figures 1, 2:
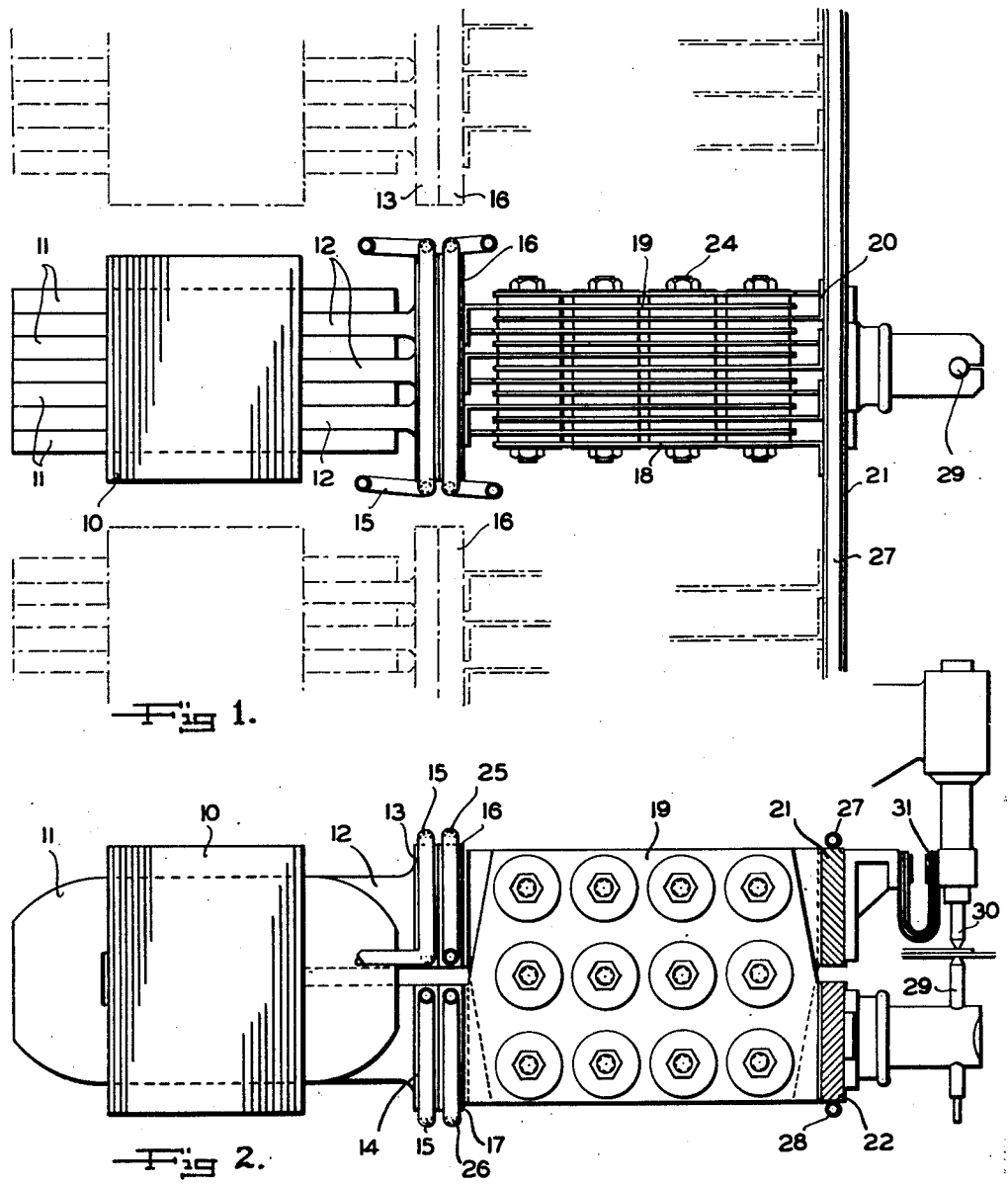

June 24, 1952 — R. H. BLAIR — 2,601,240
RECTIFIER ASSEMBLY OF THE DRY DISK TYPE
Filed Nov. 27, 1948

Inventor
ROBERT H. BLAIR
By Francis J. Klempay

Patented June 24, 1952

2,601,240

UNITED STATES PATENT OFFICE 2,601,240

RECTIFIER ASSEMBLY OF THE DRY DISK TYPE

Robert H. Blair, Warren, Ohio, assignor to The Taylor-Winfield Corporation, Warren, Ohio, a corporation of Ohio Application November 27, 1948, Serial No. 62,258

8 Claims. (Cl. 175—366)

This invention relates to an improved rectifier assembly of the dry disc type useful in the electric resistance welding art, for example, and more particularly to an improved electric translating means of the voltage reducing and rectifier type for furnishing a heavy uni-directional current at low voltage from a commercial alternating current source. The desirability of the use of this general system for furnishing the load current in resistance welding operations and other uses has heretofore been demonstrated and the scope of the present invention is accordingly more concerned with the mechanical arrangement for interposing the rectifier intermediate the alternating current source and the load.

An object of the invention is the provision in an electric resistance welding machine of the rectified current type of a simplified but yet more economical arrangement for conducting the welding current from the output terminals of the welding transformer or transformers through the rectifiers and into the current conductive supports for the welding electrodes and in this regard it is a further object of the invention to provide an improved assembly of a transformer and a rectifier, useful in resistance welding, which is more compact in nature to facilitate installation in machines, and which is possessed of greater mechanical strength and rigidity than combined apparatus heretofore proposed for the same purpose.

Another object of the invention is the provision of an improved assembly comprising a power transformer of the welding type and a dry type of rectifier connected with the secondary turns thereof which is of improved electrical characteristics, particularly as regards lower inductive reactance and a lower I²R loss in the conduction of the current from the terminal pads of the secondary turns of the transformer through the rectifier to the welding electrodes. The lowering of the overall impedance is advantageous, of course, from the standpoint of efficiency of operation but of equal or greater benefit is the substantial reduction of inductive reactance in the load circuit connected with the secondary turns of the welding transformer or transformers. The power factor in the system is materially improved and in installations utilizing a multi-phase power source the load is more equally balanced between the respective phases. Further, all these factors contribute to precision of control, the capability of which is one of the more advantageous factors of the direct current resistance welder.

Yet another object of the invention is the provision in a rectifier assembly of the dry disc type of an improved arrangement for ganging and mounting the dry type of rectifiers employed and of improved means for cooling the rectifier bank. Heretofore such rectifiers have been cooled by convection streams of air forced through the interstices of the rectifier bank and under this method the current transmission characteristic of the bank may vary quite widely. The present invention provides a practical arrangement for maintaining the rectifier elements at a fairly uniform temperature and this is accomplished by cooling the rectifier bank principally by conduction of the heat generated to flowing streams of water rather than by convection as heretofore.

A still further object of the invention is the provision of an improved dry-disc type of rectifier assembly having particular applicability, in the resistance welding field, which is highly versatile in its application in that it is in the nature of a small compact unitary assembly which may be employed either singly or in multiple for use in welding equipment of different capacities. Thus, for small machines only a single phase of the commercial source may be employed, in intermediate machines only a single assembly may be employed in each of the three phases of the source, while in large machines two or more of the standardized assemblies may be employed in each of the respective phases.

The above and other objects and advantages of the invention will become apparent upon consideration of the following detailed specification and the accompanying drawing wherein there is disclosed a preferred embodiment of the invention.

Figure 1 is a plan view of an assembled electric resistance welding unit constructed in accordance with the principles of my invention and comprising a transformer, a rectifier of the stacked dry-disc type and a connected pair of welding electrodes. Figure 1 also indicates, in dotted outline, how two other assemblies of a transformer and a rectifier may be coupled to the electrodes for three-phase actuation; and Figure 2 is a side view of the assembly shown in full lines in Figure 1.

Referring to the drawing in detail, the reference numeral 10 designates generally the "iron" or core of a transformer of the welding type having low-voltage high-amperage output characteristics and this transformer may be of more or less conventional construction. As such, it may be provided with four primary winding coils 11 for variably connecting to one of the phases of the power source to determine the output voltage of the transformer. Sandwiched between the coils 11 are the secondary turns 12 which, in accordance with usual construction, are of cast construction, being cast in multiple and integral with the terminal pads 13 and 14. The outer peripheral edges of the terminal pads 13 and 14 are grooved to receive the cooling water conducting tubes 15 which are made of material having good heat conducting properties such as copper, for example. Tubes 15 are held in position by brazing as will be understood.

The rectifier illustrated is of the full wave type and it is assembled on the pads 16 and 17 which are adapted to overlie the transformer secondary pads 13 and 14 respectively, in flat abutting relation, and to be rigidly secured to the pads 13 and 14 by suitable means, not shown. The rectifier comprises essentially a multiplicity of stacks of metallic discs 18 which are securely clamped between a plurality of spaced parallel current conductive plates or fins and in practice the rectifier elements 18 may be comprised of copper discs each having a layer of cuprous oxide on one of its faces and, of course, all the discs in each element 18 are oriented to face in the same direction so that current will readily pass in one direction while being impeded in the opposite direction. The supporting and connecting fins must be not only good current conductors but in accordance with this invention should be equally efficient heat conductors and in addition should possess good physical strength. These requirements are satisfied by hard drawn sheet copper having a thickness of .125 inch where the height of the fin is approximately eight inches and its length twelve inches. Each of the fins, designated herein by reference numeral 19, is formed with a laterally extending foot 20 for electrical and physical connection to either of the two pads 16 and 17 or to either of each of the direct current bus bars 21 and 22 positioned opposite the pads 16 and 17. Thus to provide a uni-directional path between the pad 16 and the bar 21 one each of three spaced pairs of adjacent fins is connected to the pad 16 while the other fin of each pair is connected to the bar 21. Clamped intermediate the fins of each of these pairs are twelve of the rectifying disc elements 18 and in this manner the rectifying assembly shown schematically at 23 in Figure 3 may be attained. By similar analysis it can be observed that a second uni-directional path is made possible between the pad 16 and the bar 22 while two oppositely disposed uni-directional paths are provided between the pad 17 and the bars 21 and 22. The discs 18 and the fins 19 are tightly clamped together into a compact unit by the bolts 24 which, of course, are suitably insulated with respect to the various discs and fins. The laterally extending feet 20 of the fins 19 are adapted to be rigidly but detachably connected to the pads 16, 17 and to the bars 21 and 22 by any suitable means such as cap screws, not shown, and in practice the rectifier bank is assembled with the outer faces of the feet 20 at one end of the unit lying accurately in a common plane while the outer faces of the feet 20 at the other end of the unit lie accurately in a spaced parallel plane. Further, such faces are preferably silver plated so that high efficient electric and heat conductive interconnections are effected between the fins and the pads and bars. Now if the pads 16 and 17 are of uniform thickness and if the outer faces of the transformer secondary terminal pads 13 and 14 are faced to lie accurately in a common plane it will be obvious that the highly efficient electrical connections will be made between the transformer secondaries and the rectifier assembly. The same is also true as regards the rectifier assembly and the bus bars 21 and 22, assuming that the mounted bases of the bars are smoothly surfaced.

Extending about the periphery of the mounting pad 16 and in intimate contact therewith is a tube 25 for conducting cooling liquid and a similar tube 26 is similarly positioned on the periphery of the pad 17. A similar tube 27 extends along the upper edge of the bar 21 and a similar tube 28 extends along the lower edge of the bar 22. The tubes 25—28 are preferably constructed of copper for good heat conductivity and to increase the conduction of heat as well as to provide rigid mounting for the tubes the edges of the pads 16, 17 and of the bars 21, 22 may be grooved to receive a portion of the tubes and the tubes may be brazed in position in these grooves as is well understood in the welding machine art.

In the practical use of the invention a suitably supported and normally fixed electrode 29 is arranged to be electrically connected to the current conductive bar 22 by means of suitable low impedance connectors and a movable electrode 30 is arranged to be electrically connected with the bar 29 through a flexible current conductive band 31.

For small machines but a single phase of the power source will be utilized and in this case the bars 21 and 22 will be quite short—being of a length merely to cover all the lugs 20 of the fins 19 of the rectifier pack. For three-phase operation of larger machines three of the transformers and rectifier assemblies will be utilized in the manner suggested by the full and dotted lines of Figure 1 and in this case the direct current conducting bars 21 and 22 will have a longer length sufficient to cover all the lugs 20 of each of the three rectifier packs.

Since the current conductive plates or fins 19 of the rectifier pack are closely coupled with the secondary turns of the transformer 10—12 and are in effect mounted directly on the terminal pads of the secondary turns the secondary or load circuit of the transformer will have a minimum of inductive impedance and consequently the system will have a high current rating. In prior rectifying systems heretofore proposed for resistance welding purposes quite long and looped conductors have been employed for connecting the transformer secondary with the input terminals of the rectifier, resulting in substantial inductive reactance in the power circuit. It should also be observed that the substantial areas of contact between the plates 16, 17 and the pads 13, 14 and between the feet 20 of the fins 19 and the plate 16, 17, 21 and 22 together with the closeness of the couplings and the short longitudinal dimensions of the fins 19 results in current paths of extremely low resistance which further favors the flow of the welding current and the overall efficiency of the system. In addition to these considerations of desirable electrical characteristics the disclosed arrangement of the components of the system is highly advantageous from a mechanical standpoint in reducing the quantities of copper and other materials required in providing a combined unit which may readily be incorporated in a welding machine housing of practical dimensions, and in providing a pre-assembled standardized power unit for powering direct current welders of widely varying capacities from a commercial alternating current source.

In the practice of the invention the rectifier pack or packs will preferably be so positioned that the fins 19 will lie in vertical planes to facilitate the circulation of air upwardly through the interstices between the fins 19 and discs 18 and this upward convection current will normally be sufficient to cool the center part of the pack or packs. However, in accordance with this invention principal reliance is placed on the water cooling tubes to conduct the excess heat away from the rectifiers. Since the fins 19 are short in length, of appreciable mass, are formed of material having good heat conducting qualities, and are intimately bonded to the copper plates 16, 17 and bars 21 and 22 heat will be more efficiently transmitted from any part of the rectifier pack to the plates and bars mentioned and by cooling each of these plates and bars in the manner above explained the excess heat will be readily carried away. Further, by controlling the volume of the cooling fluid passed through the tubes 25—28 or by regulating its temperature the temperature rise of the rectifier electrodes may be kept between predetermined limits for uniformity of operation of the welding machine.

The above specifically described embodiment of the invention should be considered as illustrative only as obviously many changes may be made therein without departing from the spirit or scope of the invention. For example, instead of forming the right-angularly disposed feet on the fins 18 and 19 for connection to the bus bars 21, 22 and the copper plates 16, 17 these parts and bars may be formed with slotted extensions into which straight fins are fitted for mechanical and electrical connection. Also the transformer pads (13 and 14) themselves may receive the rectifier fins directly either in slots as mentioned or on a flat surface as shown and it should therefore be understood that the prime consideration of the invention is the close and adequate coupling of the rectifier banks on the welding transformers. Flat connections between straight rectifier fins and the bus bars and transformer pads may also be effected without the use of slots.

An important feature of the invention is the fact that the rectifier is water-cooled at both ends and air-cooled at its middle portion whereby the rectifier may be operated under heavy load for long periods without deterioration.

It should be obvious that the power packs described herein, each comprised of a single phase welding transformer and a single phase full-wave rectifier may be connected to the power supply, to each other, and to the welding electrodes in a large number of specific arrangements, depending on requirements as to capacity, current fluctuation, etc. Thus, I may employ a delta connection between the power supply and the transformer primaries and in some applications where a high average DC current is desired I may employ in the same machine one bank of packs connected in delta and another bank of packs connected in Y to give a resultant DC output having twelve phase characteristics. This highly persistant current flow is desirable in certain resistance welding applications. Another possible modification is the closing of the secondary circuits of the welding transformer in delta by means of low impedance strap conductors to produce three-phase full-wave rectification.

While the direct current power supply of the invention comprised of a transformer, a rectifier pack, and cooling means therefor is of special utility in electric resistance welding machines and has been so described above it should be noted that the assembly is equally applicable to other specific uses requiring heavy direct currents of low voltage such as in electroplating equipment, for example.

Reference should be had to the appended claims in determining the scope of the invention.

I claim:

1. A rectifier assembly comprising a plurality of longitudinally disposed spaced parallel current-conducting fins lying in vertical planes and connected at one of their ends to a pair of current-conductive plates spaced one above the other and lying in a common vertical plane and disposed transversely with respect to the vertical planes of said fins, a plurality of dry disc rectifier elements clamped between said fins, said plates being adapted to be detachably secured to the secondary terminal pads of a welding transformer, the opposite end portions of said fins being bent transversely to provide integral connecting lugs lying in a common plane for connection to a pair of transversely disposed and vertically spaced current-conducting bus bars.

2. In electric resistance welding apparatus the combination of a welding transformer having water-cooled secondary terminal pads, water-cooled bus bars spaced outwardly from said pads, and a rectifier assembly interposed between said pads and bars and comprising a plurality of spaced current-conducting fins connected with said pads and bars, dry disc rectifier elements clamped between said fins, the arrangement being such that said assembly is cooled by the flow of air between said fins and by the conduction of heat along said fins to both said pads and bars.

3. Apparatus according to claim 6 further characterized in that said assembly comprises a pair of current-conducting plates secured to one end of said fins, said plates overlying said pads in intimate contact therewith, and means to cool said plates by a flowing stream of cooling fluid.

4. In electric resistance welding apparatus the combination of a transformer having a U-shaped secondary winding with each end of said winding having an outwardly facing terminal pad, a pair of current-conducting plates disposed substantially parallel to the outer faces of said pads and spaced outwardly therefrom, a plurality of spaced parallel current-conducting plates interconnecting said pads and said first mentioned plates in both heat exchanging and current-conducting relation therewith, a plurality of dry disc rectifier elements clamped between said second mentioned plates, each of said second mentioned plates being rigidly connected at one end to one of said pads in flat overlying relation therewith.

5. Apparatus according to claim 4 further characterized in that the other ends of said second mentioned plates are rigidly connected to said first mentioned plates in flat overlying relation therewith.

6. Apparatus according to claim 4 further characterized in that said second mentioned plates lie in vertical planes whereby said rectifier assembly may be cooled by an upward flow of air through the interstices existent in said second mentioned plates and said elements.

7. Apparatus according to claim 4 further including liquid conducting tubes extending along the outer peripheral edges of said first mentioned plates for conducting cooling liquid, said tubes being constructed of material having good heat conducting properties and being mounted in intimate contact with the material of said first mentioned plates substantially throughout the length of said tubes.

8. A rectifier assembly of the dry disc type comprising a plurality of spaced parallel current-conducting plates, a plurality of dry disc rectifier elements clamped between said plates, a pair of current-input pads rigidly connected to one end of said plates and having flat overlying relation with substantial surface areas of the plates, a pair of current-output bars rigidly connected to the opposite ends of said plates and having flat overlying relation with substantial surface areas of the plates, and means to conduct cooling fluid in heat exchanging relation to said pads and bars whereby heat generated by said elements will be extracted through said plates and connections into said pads and bars.

ROBERT H. BLAIR.

REFERENCES CITED

The following references are of record in the file of this patent:

UNITED STATES PATENTS

| Number | Name | Date |
| --- | --- | --- |
| 2,119,381 | Cheeseman et al. | May 31, 1938 |
| 2,175,841 | Kafka et al. | Oct. 10, 1939 |
| 2,412,989 | Kotterman | Dec. 24, 1946 |